United States Patent
Carter

[15] 3,659,878
[45] May 2, 1972

| | | | |
|---|---|---|---|
| [54] | ELEVATED CYCLE VEHICLE UTILIZING A CONVENTIONAL BICYCLE FRAME | | |
| [72] | Inventor: | Edward T. Carter, 1227 Olive St., Philadelphia, Pa. 19130 | |
| [22] | Filed: | May 25, 1970 | |
| [21] | Appl. No.: | 40,051 | |
| [52] | U.S. Cl. | ...........280/7.15, 280/278, 280/291, 280/289 | |
| [51] | Int. Cl. | ..................B62k 3/02 | |
| [58] | Field of Search | ...........280/278, 287, 291, 261, 7.1, 280/7.15, 7.11, 289 | |

[56] References Cited

UNITED STATES PATENTS

| | | | |
|---|---|---|---|
| 3,113,785 | 12/1963 | Bohenkamp | 280/7.15 |
| 895,753 | 8/1908 | Hedstrom | 280/7.16 |
| 415,789 | 11/1889 | Pendergast | 280/163 |
| 3,501,119 | 3/1970 | Rich | 280/289 |
| 3,486,727 | 12/1969 | Timms | 280/289 |

*Primary Examiner*—Kenneth H. Betts
*Attorney*—Beveridge & De Grandi and Michael F. Beausang, Jr.

[57] ABSTRACT

An elevated cycle vehicle is formed from a conventional bicycle frame, inverted from its normal position so that the center post previously used to support the bicycle seat extends downwardly from the sprocket bearing assembly. The contractable clamping means at the lower end of the center post receives a projection which is attached to horizontally oriented step means which assist a rider in boarding the vehicle. An elongated seat has a forward socket which receives a post extending upwardly from frame elements lying forwardly of the center post, while the rear portion of the seat is supported by posts connected to the frame elements lying rearwardly of the center post.

4 Claims, 6 Drawing Figures

Patented May 2, 1972 3,659,878
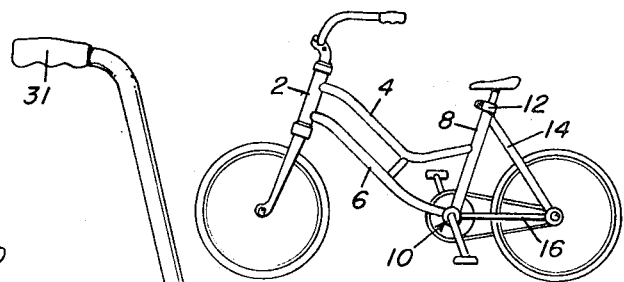
FIG.1
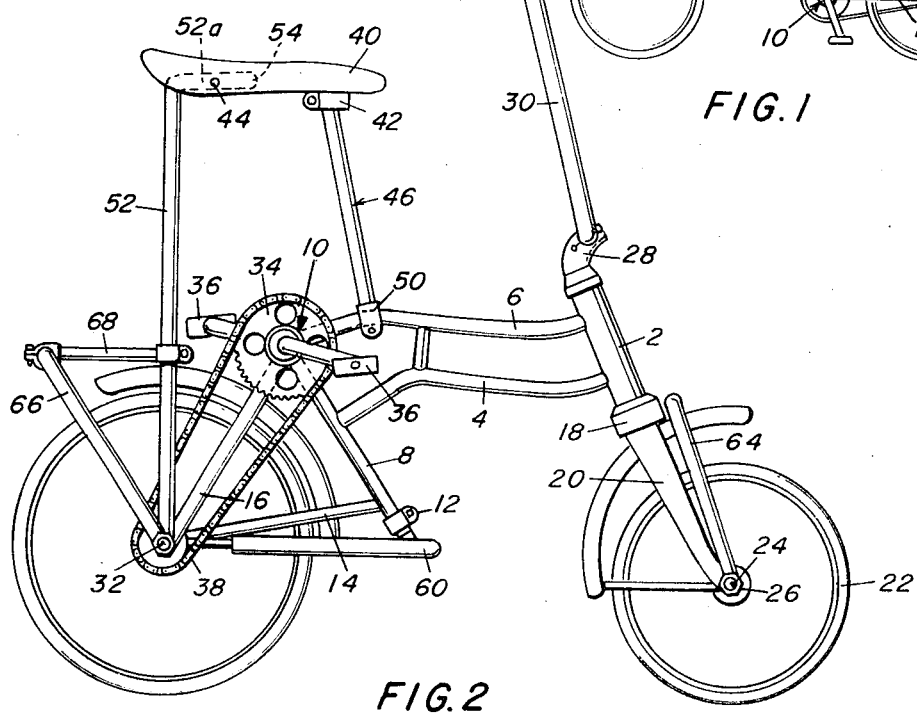
FIG.2
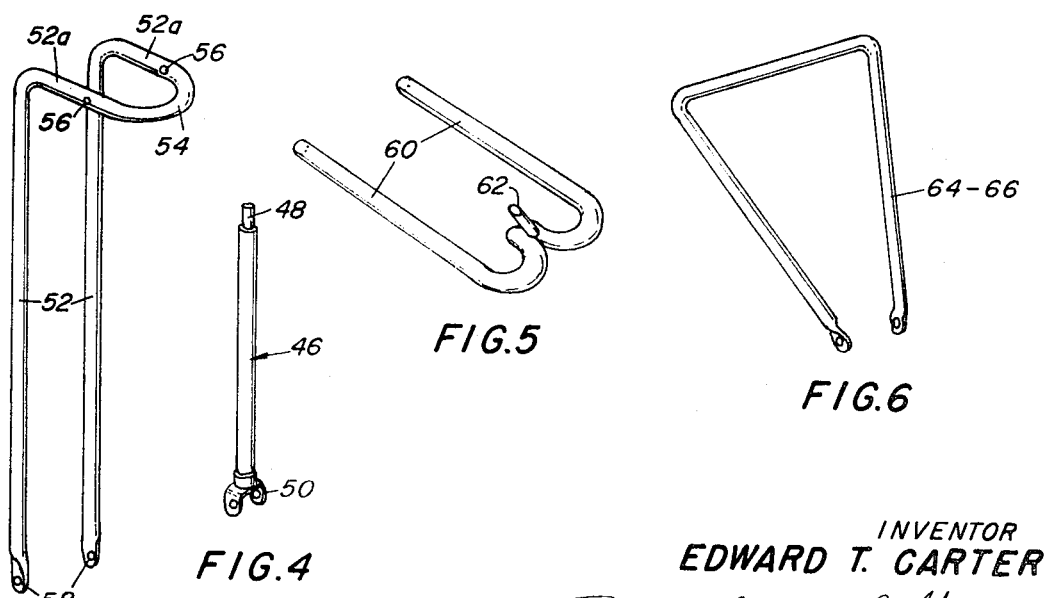
FIG.3
FIG.4
FIG.5
FIG.6
INVENTOR
EDWARD T. CARTER
BY Beveridge and DeGrandi
ATTORNEYS

ELEVATED CYCLE VEHICLE UTILIZING A CONVENTIONAL BICYCLE FRAME

This invention relates to a novelty vehicle, easily made from a conventional bicycle but adapted to carry the rider at an elevated position.

There are many types of elevated bicycle-like vehicles in the prior art. It has been known to create such a vehicle by inverting a conventional bicycle frame, reversing the position of the fork and using various extension devices in order to support the rider at an elevated position. Such devices have not gained widespread acceptance, perhaps due to the relatively complicated adapter kits, structural instability of the handlebar and seat supporting means and the difficulty in boarding the vehicle.

The vehicle of the present invention involves a departure from the prior art vehicles mentioned above due to the provision of a step which facilitates the boarding of the vehicle by a rider and due to the manner in which the seat is supported from the cycle frame.

Briefly, the step which is used to assist the rider in mounting the vehicle includes a projection which is held in and supported by the contractible clamping means at the lower end of the center post of the cycle frame. This clamping means, before inversion of the vehicle frame to make the elevated seat, is used for supporting a bicycle seat.

The seat of this improved vehicle is elongated and it is located higher than the pedal sprocket bearing assembly. A forward support post is used to connect a portion of the vehicle frame which lies forwardly of the pedal socket bearing assembly to the vertically oriented forward mounting socket in the elongated seat. The rear portion of the seat is supported by a pair of transversely spaced support posts which are connected to portions of the frame which lie rearwardly of the pedal sprocket bearing assembly, and are constructed in a particular fashion to maintain the post at a fixed orientation with respect to the seat.

The nature of my improvements may be best understood by referring to a preferred embodiment thereof which is illustrated in the accompanying drawings wherein FIG. 1 is a somewhat abbreviated drawing of a conventional bicycle before being converted into the vehicle of this invention;

FIG. 2 is a side elevation of the preferred form of the invention;

FIG. 3 is a perspective view of the single element which incorporates both of the rear support posts for the elevated elongated seat;

FIG. 4 is a perspective view of the forward support post for the elevated seat;

FIG. 5 is a perspective view of the step which may be used by a rider when boarding a vehicle; and, FIG. 6 is a perspective view of spill bars which may be added to the front and rear wheel assemblies.

The relative orientation of the various elements in the cycle frame is well known and shown in FIG. 1 which depicts a girl's bicycle having a front wheel supported on a fork which is rotatably mounted in a steering fork bearing assembly 2. A pair of frame elements 4 and 6 connect the steering fork bearing assembly 2 to the upright center post 8 and the pedal sprocket bearing assembly 10. A contractible clamping means 12 is located at the upper end of the center post 8 to receive the post on the bicycle seat. A pair of frame elements 14 and 16 extend rearwardly from the center post 8 and the pedal sprocket bearing assembly 10 to support the axle of the rear wheel in any of several ways well known to bicyclists.

The same basic frame used in the conventional bicycle of FIG. 1 is also found in the elevated vehicle of FIG. 2; however, the frame is in an inverted position. The same numerals have been used both in FIGS. 1 and 2 in order to facilitate an understanding of the orientation of the frame as it appears in FIG. 2. In FIG. 2, the steering fork bearing assembly 2 turnably supports the front fork 18 which includes a conventional bifurcated lower portion 20 which extends on opposite sides of the front wheel 22 and is connected to the front wheel axle 24 by nuts 26. Unlike the arrangement of FIG. 1, the elevated vehicle of FIG. 2 has the bifurcated lower portion of the fork lower than the pedal sprocket bearing assembly 10.

A handlebar assembly includes a conventional gooseneck fitting 28 and approximately extremely high handlebars 30 which have a conventional spacing between the handgrips 31. The gooseneck fitting 28 is connected to the front fork at a location within the steering fork bearing assembly 2 in any of several manners conventionally employed in ordinary bicycles.

Connected to and extending rearwardly from the housing of the steering fork bearing assembly are the frame elements 4 and 6. These elements are connected to pedal sprocket bearing assembly 10 and to the center post 8 which, as before, has the contractible clamping means 12 at its extremety which now is its lower end. The frame members 14 and 16 extend rearwardly from the center post 8 and the pedal sprocket bearing assembly 10 to a position where they support the rear axle 32. A sprocket 34 with pedals 36 connected thereto is used to drive the rear wheel by means of a chain 38.

The bicycle seat 40 is elongated and located higher than the pedal sprocket bearing assembly. It is of standard construction, having a vertically oriented mounting socket 42 at its forward end. The rear mounting means includes a pair of horizontally oriented holes 44 which are transversely spaced due to their presence at the opposite depending side portions of the seat.

The forward end of the seat 40 is supported by the forward support post 46 which has an upper end portion 48 of reduced diameter (see FIG. 4) retained within the forward mounting socket 42 of the seat. The lower end of the forward support post 46 is connected to the frame member 6 by means of a contractible clamp 50.

The rear of the seat 40 is supported by a pair of transversely spaced rear support posts 52 which are connected together by an integral arcuate joining section 54 as shown in FIG. 3. Each of these posts has a horizontal portion 52a at its upper end with fastener-receiving openings 56 located at longitudinally medial portions thereof. The lower end of the support posts 52 are provided with openings 58 which may be connected to the frame members 16 and 14 by the rear axle nuts. The upper ends of the support posts are connected to the seat 40 by bolts which pass through the openings 44 in the seat and through the openings 56 in the horizontal upper portions of the rear support posts. When connected in this fashion, the horizontal portions 52a will lie against the vertical and/or horizontal portions of the undersurface of the seat 40 in order to maintain a fixed orientation between the posts 52 and the seat 40, thereby preventing undesired relative movement between the elements.

Due to the height of the vehicle, it is desirable to provide some means to assist the rider in getting aboard the elevated seat 40. This may be done by using the contractible clamping means 12 which once supported a bicycle seat for the purpose of supporting a step member preferably of the type shown in FIG. 5. This step has a pair of elongated bar portions 60 which are connected together in the vicinity of a slightly inclined post member 62. The post member 62 extends upwardly into the clamping means 12 and it is retained thereby in order to hold the steps 60 at a fixed elevation which is convenient when mounting the vehicle.

The preferred form of the vehicle also includes a forward spill bar 64 which is shown in FIG. 6 and a similarly-constructed rear spill bar 66. A pair of substantially horizontally elongated buddy bars 68 may be used if desired to interconnect the seat posts 52 and spaced apart portions on the rear spill bar 66. The bars 68 are provided with U-clamps at their opposite ends for convenient mounting on the vehicle. The buddy bars 68 may be used as a seat by a second rider of the vehicle or they may be used as a step when boarding the vehicle.

A conventional bicycle may be converted to the bicycle of FIG. 2 by a simple kit which includes only the enlarged handlebars 30, the seat-supporting posts 46 and 52, the seat 40 and, if desired, the step 60, spill bars 64 and 66 and the buddy bars 68. Conversion requires removal of the bicycle seat and inversion of the rear wheel and the pedal sprocket assembly with respect to the frame so both sprockets will lie on the right side. The front fork is inverted in the steering forks bearing assembly 2 and the elongated handlebars 30 replace the conventional handlebars in the gooseneck fitting 28. The forward seat post 46 is attached to the frame element 6, the rear seat posts 52 are connected to the frame by axle 32, and the seat is connected at 42 and 44 to the posts 46 and 52. Next, the projection 62 of the step assembly may be placed within the contractible clamp 12 (formerly used for supporting a conventional bicycle seat) and the clamp is tightened in order to retain the step in position. The spill bars 64 and 66 may be placed on the front and rear axles after suitably removing and replacing the conventional axle nuts, and the buddy bars 68 may then be installed to connect the rear spill bars 66 with the upright posts 52.

It will be apparent to those skilled in the art that the concepts utilized in the preferred embodiment of the invention are adaptable to other cycle vehicles having similar frames capable of inversion. Therefore, the invention is not to be construed as limited to the single embodiment of FIG. 2 but is intended to encompass all variations and modifications thereof within the spirit of the claims which follow.

I claim:

1. A cycle vehicle which includes an inverted conventional frame, said cycle vehicle comprising
    a pedal sprocket bearing assembly,
    a steering fork bearing assembly located forwardly of the pedal sprocket bearing assembly,
    a front fork turnably supported in the steering fork bearing assembly, said front fork having a bifurcated lower portion located below the steering fork bearing assembly and lower than the pedal sprocket bearing assembly,
    a front wheel having an axle supported on the bifurcated lower portion of the front fork,
    a handlebar assembly above the steering fork bearing assembly and connected to an upper portion of the front fork,
    a center post (of the type which supports a seat in a conventional cycle) depending from the pedal sprocket bearing assembly and having a contractible clamping means at its lower end,
    frame elements connecting the pedal sprocket bearing assembly to the steering fork bearing assembly,
    a rear wheel having an axle located rearwardly from and lower than the pedal sprocket bearing assembly,
    frame elements connecting the rear wheel axle to the center post,
    a seat located higher than the pedal sprocket bearing assembly,
    said vehicle being characterized by the presence of a step used to assist a rider in mounting the vehicle, said step having a projection which is held in and supported solely by the contractible clamping means at the lower end of the center post, thereby avoiding the necessity of modifying the conventional frame to accommodate said step.

2. A cycle vehicle which includes an inverted conventional frame, said cycle vehicle comprising
    a pedal sprocket bearing assembly,
    a steering fork bearing assembly located forwardly of the pedal sprocket bearing assembly,
    a front fork turnably supported in the steering fork bearing assembly, said front fork having a bifurcated lower portion located below the steering fork bearing assembly and lower than the pedal sprocket bearing assembly,
    a front wheel having an axle supported on the bifurcated lower portion of the front fork,
    a handlebar assembly above the steering fork bearing assembly and connected to an upper portion of the front fork,
    a center post depending from the pedal sprocket bearing assembly,
    first frame means connecting the pedal sprocket bearing assembly to the steering fork bearing assembly,
    a rear wheel having an axle located rearwardly from and lower than the pedal sprocket bearing assembly,
    second frame means connecting the rear wheel axle to the center post,
    said vehicle being characterized by an elongated seat which has a vertically oriented forward mounting socket and a pair of transversly spaced horizontally oriented rear mounting means, said seat being located higher than the pedal sprocket bearing assembly, a forward support post having its lower end connected to the first frame means at a point located forwardly of the center post and its upper end fixed within said forward mounting socket on the seat, a pair of transversly spaced rear support posts supported at their lower ends by the second frame means and connected at their upper ends to the rear mounting means of the seat.

3. A cycle vehicle according to claim 2 wherein the rear support posts have generally horizontal portions at their upper ends with the connection between the rear seat posts and the rear mounting means of the seat being located at a longitudinally medial portion of the horizontal portions, with the horizontal portions lying against an undersurface of the seat to maintain the rear mounting posts at a fixed orientation with respect to the seat.

4. A cycle vehicle according to claim 2 having substantially horizontal support means connected to and extending rearwardly from the rear support posts and means connected to the support means rearwardly of the rear support posts for supporting the rearward end of the support means from the second frame means.

* * * * *